United States Patent [19]

Mittelbach et al.

[11] Patent Number: 5,475,770

[45] Date of Patent: Dec. 12, 1995

[54] PARALLEL RECOGNITION OF DOCUMENT IMAGES WITH A TIME-ELAPSED PROCESSING ABORTION TO IMPROVE OVERALL THROUGHPUT

[75] Inventors: Helmut Mittelbach; Wilfried Kochert, both of Konstanz, Germany

[73] Assignee: CGK Computer Gesellschaft Konstanz mbH, Konstanz, Germany

[21] Appl. No.: 309,783

[22] Filed: Sep. 20, 1994

Related U.S. Application Data

[63] Continuation of Ser. No. 30,441, filed as PCT/EP91/01833 Sept. 26, 1991, abandoned.

[30] Foreign Application Priority Data

Sep. 24, 1990 [EP] European Pat. Off. .............. 90118614

[51] Int. Cl.$^6$ ........................................ G06K 9/00
[52] U.S. Cl. ........................ 382/181; 382/304; 395/550; 364/230.3; 364/242; 364/DIG. 1; 364/942.5; 364/DIG. 2
[58] Field of Search ................... 382/10, 38, 41, 382/49; 395/550, 800; 364/229.2, 230.1, 230.2, 230.3, 242, 270.6, 270.7, 926.8, 931.41, 941.5, 942.5

[56] References Cited

U.S. PATENT DOCUMENTS

| | | | |
|---|---|---|---|
| 4,195,344 | 3/1980 | Yamazaki | 364/200 |
| 4,803,620 | 2/1989 | Inagami et al. | 364/200 |
| 4,807,116 | 2/1989 | Katzman et al. | 364/200 |
| 4,817,175 | 3/1989 | Tenenbaum et al. | 382/49 |
| 5,146,608 | 9/1992 | Hillis | 395/800 |
| 5,155,852 | 10/1992 | Murakami et al. | 395/725 |
| 5,253,308 | 10/1993 | Johnson | 382/49 |
| 5,371,896 | 12/1994 | Gove et al. | 395/800 |

OTHER PUBLICATIONS

Chung et al. "Scheduling Periodic Jobs Using Imprecise Results". Nov. 30, 1987 NASA: Technical Reports, v 39,N9, pp. 1156–1174.

Blazewicz. "Minimizing Mean Weighted Execution . . . " Methods of Operations Research. No. 52 pp. 415–425. 1984, Abstract Only.

Patent Abstract of Japan, "Optical Character Reader", vol. 7 No. 101 (P-194(1246) Apr. 28, 1983.

*Primary Examiner*—Leo H. Boudreau
*Assistant Examiner*—Andrew W. Johns
*Attorney, Agent, or Firm*—Hill, Steadman & Simpson

[57] ABSTRACT

The image data (BDAT) associated with a respective document are transmitted to one of a plurality of recognition units for processing in a recognition process comprising a plurality of partial processes. The allocation of the processing jobs and the monitoring of the time cycles of the recognition processes is performed by a control unit (AU), by mean of which a timer is triggered to set the processing time of the recognition process in a recognition unit (e.g. RUn), the value of which is compared with an expected value for the processing time of the currently running partial process. The partial process results from the processing status of the recognition unit which is determined by status information and can be called at any time. If the status of the recognition unit is such that, on the basis of the time comparison, no potentially successful execution of the entire recognition process can be expected, this process is prematurely terminated by the control unit (AU) so that the recognition unit is available for accepting new document data, especially when all available recognition units are already busy with recognition tasks.

4 Claims, 3 Drawing Sheets

PARALLEL RECOGNITION OF DOCUMENT IMAGES WITH A TIME-ELAPSED PROCESSING ABORTION TO IMPROVE OVERALL THROUGHPUT

This is a continuation of application Ser. No. 08/030,441, filed as PCT/EP91/01833 Sept. 26, 1991, now abandoned.

BACKGROUND OF THE INVENTION

1. Field of the Invention

The invention relates to a method and a circuit arrangement for automatic character recognition on documents.

2. Description of the Related Art

Given the copious use of documents for organisational purposes in ever more areas of life, automatic recognition of characters is becoming more and more important as it offers considerable advantages with respect to time and cost outlay in comparison with manual preparation of documents in a form suitable for data processing. The useful information on a document to be read comprises manually-written or typed characters, the recognition of which is performed in a plurality of partial processes. Examples of primary partial processes of the overall recognition process are the location of a character, its preparation and analysis, as well as the assignment to a character class (classification).

The time required by a character reading system for processing a document cannot be predicted in the individual case due to the widely differing designs of forms and the complex recognition processes, which are not restricted to a standard script and precisely defined reading zones, and may vary within wide limits. As a result of coupling the character reading system to input units with a high throughput rate, for example high-speed document sorters, bottlenecks can arise during the processing of the incoming documents which could result in the document being rejected even before the recognition process commences.

SUMMARY OF THE INVENTION

The object of the present invention is therefore to provide a method and a circuit arrangement for automatic character recognition on documents with which the recognition tasks can be handled even under stringent real-time conditions.

This object is achieved by the image data associated with a respective document being prepared by an image unit and being transmitted to one of a plurality of recognition units for processing of a recognition process comprising a plurality of partial processes, the recognition unit for handling the processing job being selected by a control unit, by means of which a timer is triggered after the arrival of the prepared image data in the selected recognition unit, which timer sets the processing time of the respective recognition process running in the recognition unit, the processing status of a recognition unit being determined by status information which indicates the currently running partial process of a recognition process, the value of the timer being compared with an expected value for the processing time of the partial process currently running in the recognition unit, and if the expected value is exceeded, the control unit triggers an abortion of the recognition process in the recognition unit if a further document is awaiting processing and all recognition units are busy with recognition tasks.

The object is also achieved by an image unit for storing the image data associated with a respective document, recognition units arranged in parallel for executing recognition processes running concurrently or overlapping, and a central control unit for controlling the data exchange between the units, a first line system for transmitting the data from the image unit to one of the connected recognition units, and a second line system for coupling the control unit to all recognition units, memory means for receiving and making the data available in the image unit, for picking up the data signals and control signals transmitted by the line systems and making them available in the individual recognition units and, in the control unit, control devices for evaluating the control signals for the data traffic between the control unit or the image unit, respectively, and one of the recognition units, processing means in the recognition units for executing the partial processes associated in each case with a recognition process, and signal processors for controlling the functions to be executed in the units, of which the signal processor associated with the control unit has in each case a timer for monitoring the processing time of the recognition process running in a recognition unit, by means of which, when an expected value for the processing time of the currently running partial process, recognizable by means of a status signal, is exceeded, an interrupt message can be triggered if a further document is awaiting processing and all recognition units are busy with recognition tasks.

Accordingly, an allocation of the recognition process for a current document is carried out at one of a plurality of recognition units so that recognition jobs can be processed simultaneously in a plurality of recognition units.

The allocation of processing jobs to the individual recognition units is initiated by a control unit which also monitors the time cycles of the recognition processes in the recognition units. To do so it triggers a timer for setting the processing time of the recognition process which is compared with an expected value for the processing time of the partial process currently running in a recognition unit. The partial process results here from the processing status of the recognition unit which is determined by status information and can be called at any time.

If the status of the recognition unit is such that, on the basis of the time comparison, no potentially successful execution of the entire recognition process can be expected, this process is prematurely terminated by the control unit if, in the case of excessive work, that is to say all available recognition units are busy with recognition tasks, a document is waiting to be processed. This ensures that the processing job is allocated without time delay to a recognition unit whose recognition process has previously been aborted.

BRIEF DESCRIPTION OF THE DRAWINGS

Details of the invention will be explained more fully with reference to an exemplary embodiment illustrated in the drawing, in which.

DETAILED DESCRIPTION OF THE PREFERRED EMBODIMENTS

Figure 1:
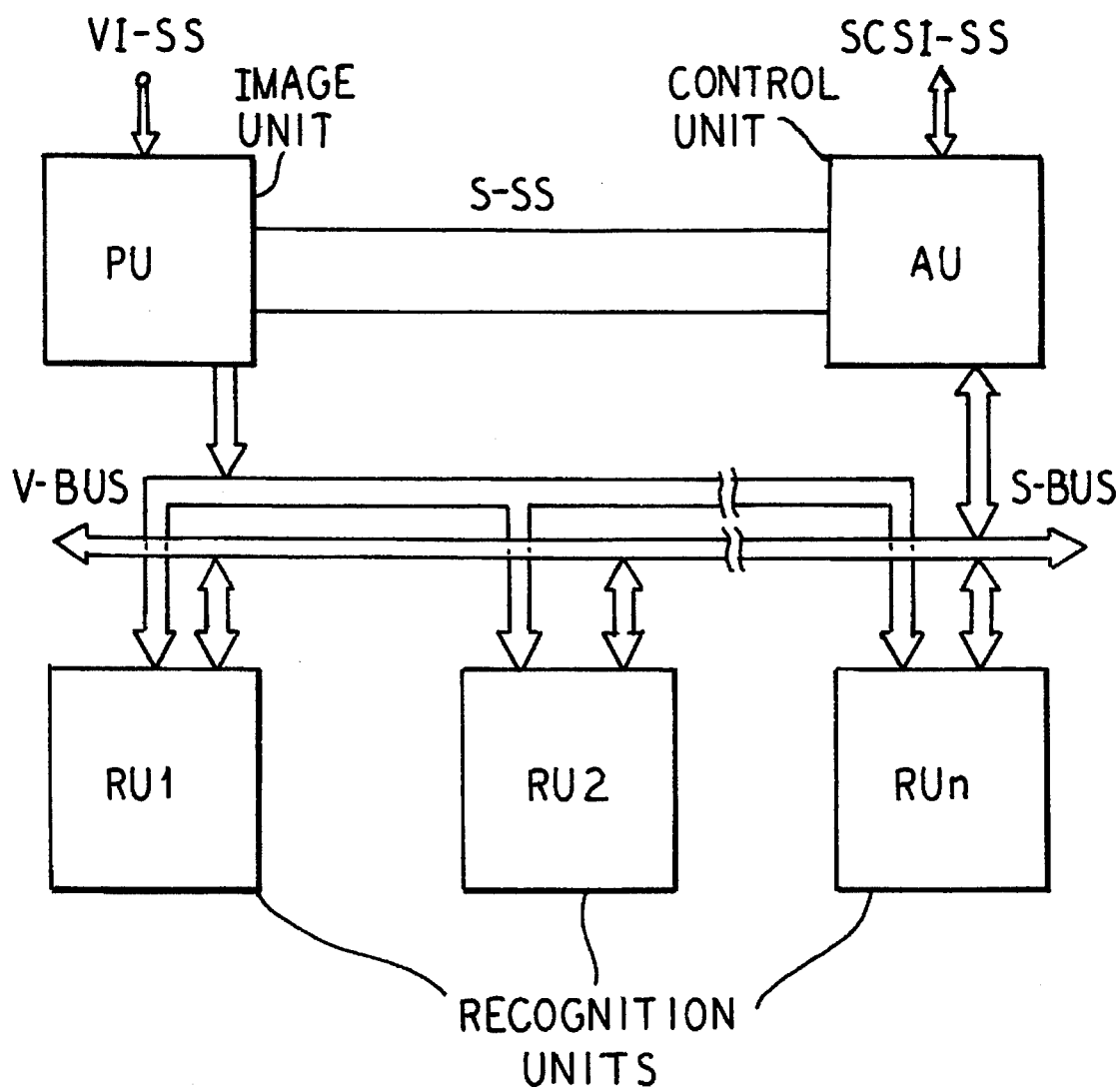
FIG. 1 shows an overview diagram of the circuit arrangement for automatic character recognition.

The overview diagram according to FIG. 1 shows the general design of the circuit arrangement for automatic character recognition of manually-written or typed characters on documents, for example cheques. The character recognition system is coupled to a document sorter with a high processing speed via an interface VI-SS, which receives the respective digital image data associated with a document from a high-resolution CCD camera (charge coupled devices) and transfers the data to an image unit PU for the preparation of the data for subsequent transmission to one of the recognition units RU1 . . . RUn. The selection of the recognition unit in which the recognition process is to be executed using the document data supplied is performed by a control unit AU which controls the data traffic between the individual units AU, PU, RU1 . . . RUn.

In this arrangement instructions and commands between the image unit PU and the control unit AU are handled via the serial interface S-SS, while the mutual communication between the control unit AU and the recognition units RU1 . . . RUn is possible due to connection of the units to a bidirectional line system S-BUS. The control unit AU distributes processing jobs to the recognition units RU1 . . . RUn, which are arranged in parallel and are of identical design, monitors the time cycle of the recognition processes, and also makes the reading result or a rejection message available at the parallel interface SCSI-SS for further evaluation after a recognition process has been executed.

Figure 2:
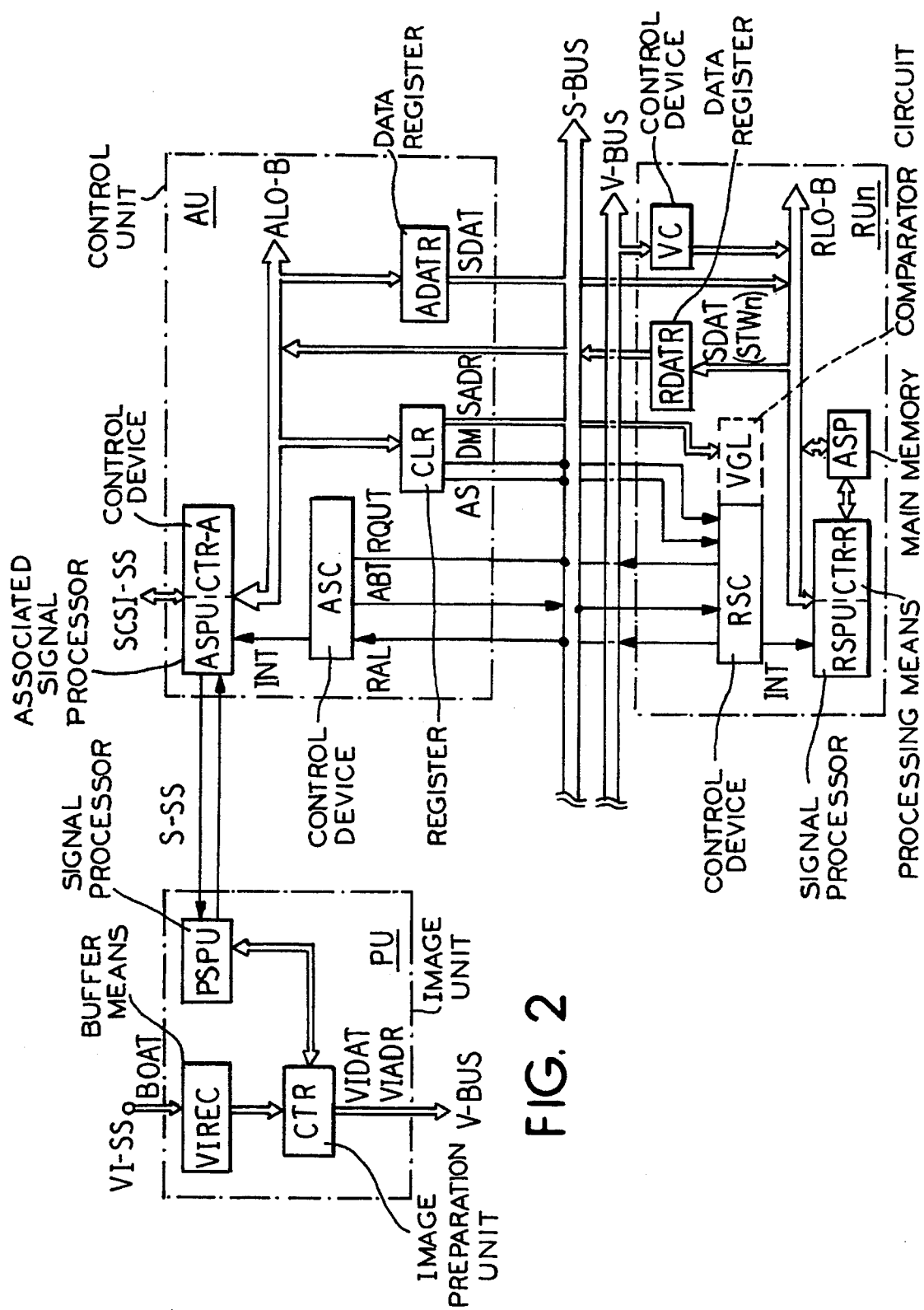
FIG. 2 shows an overview diagram of the units in the circuit arrangement according to FIG. 1.

FIG. 2 shows a block circuit diagram of the units PU, AU and RUn, the design of the recognition unit RUn being representative of that of all recognition units RU1 . . . RUn according to FIG. 1. Before it is possible to commence transmission of the data of a document prepared in the image unit PU to a selected recognition unit, the control unit AU, by means of its associated signal processor ASPU, sends a plurality of commands, comprising a command word with a defined bit length in each case, to the signal processor PSPU of the image unit PU via the serial interface S-SS.

The commands relate here to the initialisation of the image unit PU, for instance status inquiries, deletion of all register contents, setting of the start address for reading out of the main memory in which the pixel data VIDAT obtained from the image data BDAT are stored, definition of the operating mode, etc. The image unit PU is notified by a transmission command of the control unit AU which of the recognition units currently has no processing job and hence is suitable for the allocation of a recognition task.

The current processing status of the recognition unit RUn is provided in that the associated status word STWn is supplied by the signal processor RSPU of the recognition unit RUn and is entered in a data register RDATR via the local line system RLO-B. For inquiring about the status information STWn, a call address SADR is loaded into a register CLR by the signal processor ASPU via the local line system ALO-B, accompanied by the two control signals AS and DM. The status of the control signal AS indicates here the receiving (AS=0) or the transmitting (AS=1) of the data SDAT by the control unit AU, while the status of the control signal DM indicates a status inquiry or an instruction to the recognition unit by means of one data word (DM=0) or else the transmission of a plurality of data words (DM=1) between the control unit AU and the recognition unit RUn.

Each recognition unit receives via the line system S-BUS the call address SADR, which is fed to a comparator circuit VGL for determining the identity of address and its own identification number. In a control device RSC of the called recognition unit RUn, the control signals AS and DM present on the line system S-BUS are evaluated, the outputs of the data register RDATR are switched onto the line system S-BUS, and the data word STWn present is picked up with the status information via the local line system ALO-B by the signal processor ASPU in the control unit AU and temporarily stored in a memory means for further processing later.

Status signals can be extracted from the received status word STWn which indicate the current processing status of the recognition unit RUn. A recognition process comprises a plurality of partial processes, from which the partial process currently being processed is determined by evaluation of its associated status information. In addition, it is possible for a wait status for the allocation of a processing job to be extracted from the status word STWn by the control unit AU.

If the control unit AU has recognised that the recognition unit RUn is not busy after evaluation of the transmitted status word STWn, then it sends a command by means of its associated signal processor ASPU to the signal processor PSPU of the image unit PU notifying the identification number of the free recognition unit RUn. After the image data BDAT of a respective document have been received via the interface VI-SS, temporarily stored in a buffer means VIREC and prepared in the unit CTR, the data VIDAT are then transmitted via the line system V-BUS to the free recognition unit RUn selected by the destination address VIADR. The document data are transferred here in data blocks by successive interrogation of a data ready signal on the line system V-BUS, the status of which indicates in each case whether a further data block is still present for transmission to the recognition unit RUn.

By setting the data ready signal for the selected recognition unit, the recognition unit is notified of a job for a recognition task. All data signals and control signals V-BUS sent out are picked up by a control device VC and forwarded via the local line system RLO-B to the processing means CTR-R with connected main memory ASP for independent execution of the recognition process. Any old recognition process still running is aborted.

The signal processor PSPU associated with the image unit PU notifies the corresponding signal processor ASPU of the control unit AU of the end of the data transmission executed, including specification of the identification number of the receiving recognition unit RUn, provided that no error was reported by the image unit PU, caused for example by the buffer means VIREC overflowing or by the data associated with the waiting document not being fetched by the called recognition unit RUn, which result in each case in a rejection message to a connected output unit by the control unit AU via the interface SCSI-SS.

With the arrival of the data at the called recognition unit RUn, the signal processor ASPU starts a timer which sets the processing time of the recognition process running in the recognition unit RUn. An expected value is defined for each partial process with which a potentially successful execution of the entire recognition process can be expected in the maximum time available for the processing of a document.

If one of the expected values for the processing time of the partial processes currently running in the recognition unit RUn with the respective timer value is exceeded, if necessary the control unit AU can trigger an abortion of the current recognition process. If, for example, the predetermined expected value for the processing time in the partial process for the location of a character is exceeded, then the probability of the entire recognition process being successfully completed in the time available is low.

A recognition process is aborted in the manner described whenever a new processing job is present and all recognition units are busy with recognition processes. Therefore, in order to prevent a queue forming for the processing of pending documents, a recognition process must be prematurely terminated in a busy recognition unit. The status inquiry of the individual recognition units allows the control unit AU to select only the recognition processes which have little prospect of success.

Commands between the control unit AU and the recognition units serve to notify the results of the recognition units to the control unit AU. The operating instruction required for this purpose is generated by the signal processor ASPU of the control unit AU, the call address SADR, the control signals AS and DM with the corresponding statuses (AS=1, DM=0), as well as the data word SDAT containing the instruction are sent to the line system S-BUS in the same manner as the status inquiry.

In addition, the signals ABT and RQUT, which serve for handling the data transfer, are generated by the control devices ASC and RSC respectively. To make the data word SDAT available, the signal ABT is set (ABT=1) and transmitted, and reset again (ABT=0) after the acknowledgement (RQUT=0) has been received. In the control device RSC of the called recognition unit RUn, an interrupt signal INT to the signal processor RSPU is triggered by the arrival of the data ready signal ABT and causes the data present on the line system S-BUS to be picked up, the signal RQUT indicating the arrival of the data (RQUT=0). After the reset data ready signal ABT (ABT=0) has been received, the acknowledgement is likewise withdrawn again (RQUT=1). If the selected recognition unit RUn has aborted its currently running recognition process, the control unit AU generates a rejection message for the document producing no reading result.

If the recognition unit RUn wishes a data transfer, for example notification of the reading result after a successfully completed recognition process, or transmission of error messages, it sends out a signal RAL which causes an interrupt message INT in the signal processor ASPU of the control unit AU and hence an interrogation of the changed status word STWn. The fetching of the result data is prepared by the control unit AU by sending out an instruction. A plurality of data words SDAT, which contain the recognition result of the addressed recognition unit, are then read out of the main memory ASP of the recognition unit RUn and are read into a memory means provided in the control device CTR-A of the control unit AU.

The data transmission in the reverse direction, that is to say from the control unit AU to the recognition unit RUn, proceeds using the data register ADATR in the control unit AU in the same manner, but a preparatory instruction to the recognition unit RUn is not required.

Figure 3:
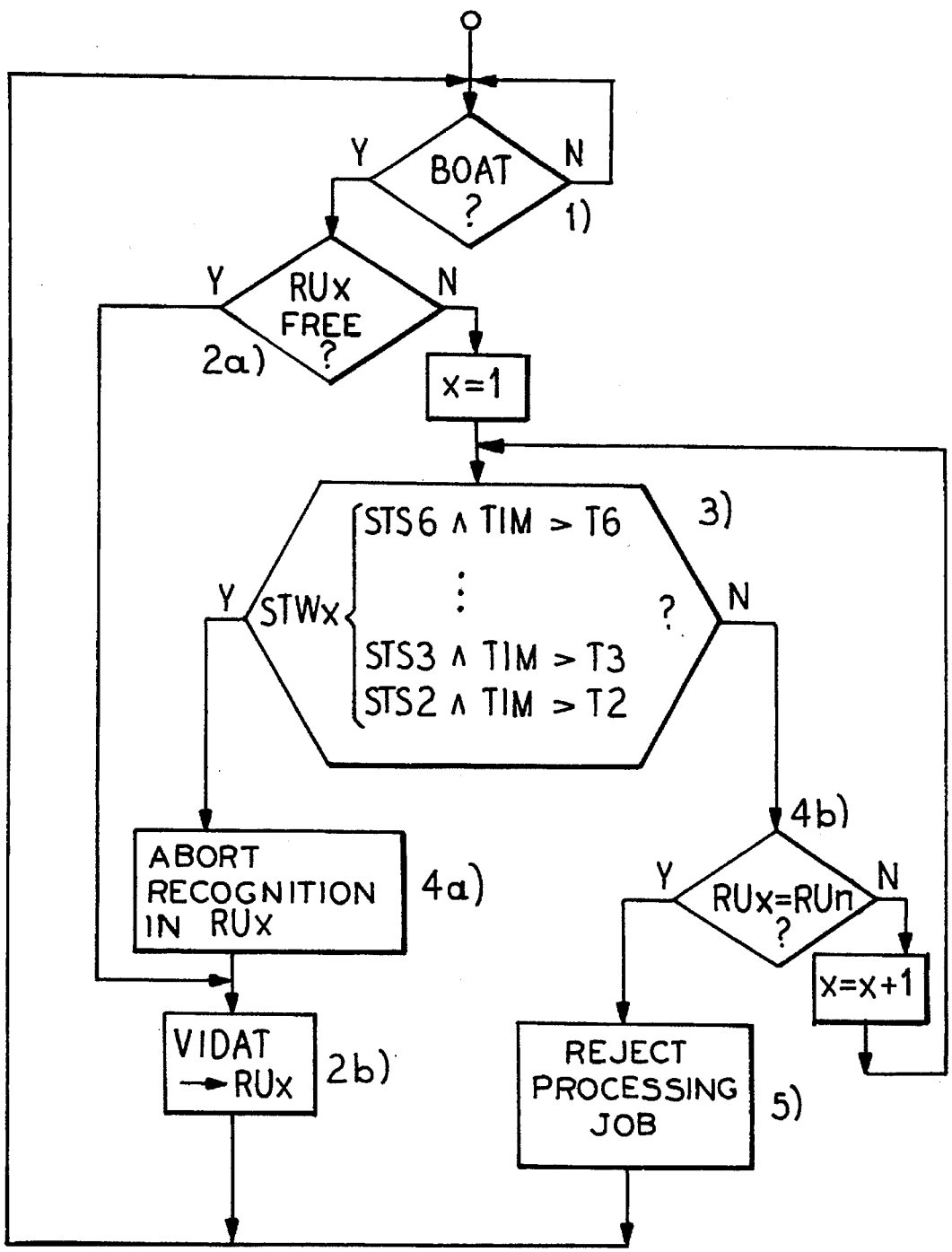
FIG. 3 shows a flowchart for the method for automatic character recognition according to the invention.

FIG. 3 shows a flowchart for automatic character recognition according to the invention with the following method steps:

1) The basis for the execution of a recognition process is the image data BDAT of a respective document which are to be transmitted after preparation in an image unit to one of a plurality of recognition units for independent processing in a maximum time available.

2a) The interrogation of the individual recognition units as to whether they have the processing status or not is carried out by a control unit, in that the status word associated with a recognition unit in each case is checked without it being necessary for any recognition process running to be interrupted. If the evaluation of the status word indicates that a recognition unit RUx is not busy, that is to say has no recognition process to execute at present, then the recognition unit RUx receives the prepared pixel data VIDAT in accordance with method step 2b).

2b) The recognition unit RUx fetches the data VIDAT block-by-block by interrogation of a data ready signal from the image unit.

3) If all recognition units have been assigned processing jobs for executing recognition processes, and if a further document is awaiting analysis, one recognition process must be prematurely terminated to comply with the conditions for a real-time method. The criterion for or against abortion is the expected probability of a successful completion of the entire recognition process in a recognition unit.

A status inquiry of the recognition unit RUx is executed by the control unit, in which an associated status word STWx is read, and from this the current processing status is determined. Each of the partial processes constituting the entire recognition process, for example the location of the amount field of interest on a document, the segmentation of the parts of the amount in the field located, the analysis of the amount parts, etc., is defined in the status word STWx by status information STS2, STS3, STS4, etc., by means of which it can be established which part of the recognition task is currently being processed by the recognition unit RUx.

Maximum times for the processing time of the individual partial processes which allow one to expect a potentially successful execution of the entire recognition process are determined for each partial process. The predetermined expected value for the partial process currently running in the recognition unit RUx, for example the expected value T2 for the location of the amount field on the document, is compared with the value of a timer TIM, which is assigned to the recognition unit RUx and is triggered by the control unit, and which sets the processing time of the current recognition process. If the expected value T2 is exceeded, the probability of a reading result being obtained within the maximum time available for the entire recognition process is low, so that this recognition process can be aborted. The corresponding associated expected values T3 ... T6 are used in another currently running partial process in the same manner.

4a) Abortion of the currently running recognition process of the recognition unit RUx, which is effected by the control unit sending out a corresponding command, and acceptance of the pending document data VIDAT from the image unit in accordance with method step 2b).

4b) If the control unit does not initiate an abortion of the recognition process on the basis of the time conditions, then the processing status of the next recognition unit (x=x+1) is checked in accordance with method step 3).

5) If a premature abortion of its recognition process is not carried out for any recognition unit by the control unit, the document awaiting processing must be provided with a rejection message.

In each case the assignment of a new processing job for execution of a recognition process can commence following the method steps 2b) and 5).

Although other modifications and changes may be suggested by those skilled in the art, it is the intention of the inventors to embody within the patent warranted hereon all changes and modifications as reasonably and properly come within the scope of their contribution to the art.

I claim:

1. A method for automatic character recognition on documents, comprising the steps of:

preparing image data of a respective document by an image unit, transmitting said image data to a recognition unit of a plurality of recognition units for processing by a recognition process comprising a plurality of partial processes, selecting in a selecting step a selected recognition unit of said plurality of recognition units for handling a processing job by a control unit, triggering a timer by said selecting step after arrival of prepared image data of a respective document in said selected recognition unit of said plurality of recognition units, said timer setting a processing time of a respective recognition process running in said selected recognition unit of said plurality of recognition units, determining in a determining step a processing status of a recognition unit by status information which indicates a status of a currently running partial process of a recognition process, comparing a value of the timer with an expected value for processing time of said partial process currently running in said recognition unit checked during said determining step, and if said expected value is exceeded, and if a further document is awaiting processing and all of said plurality of recognition units are busy with recognition tasks triggering an abortion of the recognition process in said recognition unit checked during said determining step by said control unit and accepting said further document by said recognition unit.

2. A circuit arrangement for automatic character recognition on documents, comprising:

an image means for storing image data of a respective document, a plurality of recognition means arranged in parallel for executing recognition processes running concurrently or overlapping, wherein the image data of a respective document is assigned to one of said plurality of recognition means, a central control means for controlling data exchange between said image means and said recognition means, a first line means for transmitting the data from said image means to one of said plurality of recognition means, a second line means for coupling said central control means to all of said plurality of recognition means, memory means for receiving and making data available in said image means, for picking up data signals and control signals transmitted by said first and second line means and making said data signals and said control signals available in individual ones of said plurality of recognition means and in said central control means, control devices for evaluating said control signals for the data traffic between said central control means or said image means respectively and one of said plurality of recognition means, processing means in said recognition means for executing the partial processes associated in each case with a recognition process, and signal processors for controlling functions to be executed in said image means and said central control means and said recognition means, said signal processors associated with said central control means has in each case a timer means for monitoring processing time of the recognition process running in said recognition means, by which, when an expected value for the processing time of a currently running partial process, recognizable by a status signal, is exceeded, an interrupt message can be triggered if a further document is awaiting processing and all of said recognition means are busy with recognition tasks, whereupon said further document is assigned to said recognition means causing said interrupt message.

3. A method for automatic character recognition on documents, comprising the steps of:

preparing image data of a respective document by an image unit, transmitting said image data to one of a plurality of recognition units for processing by a recognition process comprising a plurality of partial processes, selecting in a selecting step a selected recognition unit of said plurality of recognition units for handling a processing job by a control unit, triggering a timer by said selecting step after arrival of prepared image data of a respective document in said selected recognition unit of said plurality of recognition units, said timer setting a processing time of a respective recognition process running in said selected recognition unit of said plurality of recognition units, determining in a determining step a processing status of a recognition unit by status information which indicates a status of a currently running partial process of a recognition process, comparing a value of the timer with an expected value for processing time of said partial process currently running in said recognition unit checked during said determining step, and if said expected value is exceeded, triggering an abortion of the recognition process in said recognition unit checked during said determining step by said control unit if a further document is awaiting processing and all of said plurality of recognition units are busy with recognition tasks so that no result is obtained from an aborted recognition process.

4. A method for automatic character recognition on documents, comprising the steps of:

preparing image data of a respective document by an image unit, transmitting said image data to one of a plurality of independent recognition units for processing by a recognition process comprising a plurality of partial processes, selecting in a selecting step a selected recognition unit of said plurality of independent recognition units for handling a processing job by a control unit, said processing job corresponding to a document, triggering a timer by said selecting step after arrival of prepared image data of a respective document in said selected recognition unit of said plurality of recognition units, said timer setting a processing time of a respective recognition process running in said selected recognition unit of said plurality of independent recognition units, conducting simultaneous processing of a plurality of image data in said plurality of independent recognition units, determining in a determining step a processing status of a recognition unit by status information which indicates a status of a currently running partial process of a recognition process, comparing a value of the timer with an expected value for processing time of said partial process currently running in said recognition unit checked during said determining step, and if said expected value is exceeded, triggering an abortion of the recognition process in said recognition unit checked during said determining step by said control unit if a further document is awaiting processing and all of said plurality of independent recognition units are busy with recognition tasks so that no result is obtained from an aborted recognition process.

* * * * *